United States Patent
Taniguchi et al.

(10) Patent No.: US 11,828,336 B2
(45) Date of Patent: Nov. 28, 2023

(54) SPRING LOCK MECHANISM

(71) Applicant: BIZEN HATSUJO CO., LTD., Okayama (JP)

(72) Inventors: Yoshinori Taniguchi, Okayama (JP); Tokuzo Kobayashi, Okayama (JP); Kengo Tamura, Okayama (JP); Arata Shimizu, Okayama (JP); Yasushi Taniguchi, Okayama (JP)

(73) Assignee: BIZEN HATSUJO CO., LTD., Okayama (JP)

( * ) Notice: Subject to any disclaimer, the term of this patent is extended or adjusted under 35 U.S.C. 154(b) by 460 days.

(21) Appl. No.: 17/049,422

(22) PCT Filed: Aug. 2, 2019

(86) PCT No.: PCT/JP2019/030569
§ 371 (c)(1),
(2) Date: Oct. 21, 2020

(87) PCT Pub. No.: WO2020/031911
PCT Pub. Date: Feb. 13, 2020

(65) Prior Publication Data
US 2021/0372493 A1 Dec. 2, 2021

(30) Foreign Application Priority Data
Aug. 6, 2018 (JP) ................... 2018-147974

(51) Int. Cl.
*F16D 51/00* (2006.01)
*B60N 2/90* (2018.01)

(52) U.S. Cl.
CPC .............. *F16D 51/00* (2013.01); *B60N 2/919* (2018.02); *B60N 2002/952* (2018.02)

(58) Field of Classification Search
None
See application file for complete search history.

(56) References Cited

U.S. PATENT DOCUMENTS 6,578,922 B2 * 6/2003 Khedira ................. B60N 2/753
297/411.3
9,676,307 B2 * 6/2017 Yamane ................. B60N 2/753
(Continued)

FOREIGN PATENT DOCUMENTS

JP H1-124434 U 8/1989
JP 2004-147791 A 5/2004
(Continued)

OTHER PUBLICATIONS

International Search Report issued in Patent Application No. PCT/JP2019/030569 dated Sep. 17, 2019.

*Primary Examiner* — Vicky A Johnson
(74) *Attorney, Agent, or Firm* — Pearne & Gordon LLP

(57) ABSTRACT

Provided is a spring lock mechanism including: a lock drum (11) provided on either one of a first member (20) and a second member (20); a coil spring (12) secured to the other member, abutting on the lock drum (11), and locking turning of the second member (30) in one direction relative to the first member (20) due to a frictional force; and a switching mechanism causing the second member (30) to turn relative to the first member (20) to switch a state in which the locking has been established and a state in which the locking has been released and held, in which the coil spring (12) abuts on an inner circumferential surface of the lock drum (11), the diameter of the coil spring (12) increases through compression of a spring wire material of the coil spring (12) in a longitudinal direction caused by the turning of the second member (20), the coil spring thus further presses the inner circumferential surface of the lock drum (11) and locks the turning due to the frictional force, and the switching mechanism accompanies an operation of extending or shortening a length of the coil spring (12) in the state in which the locking (Continued)

has been released relative to the length of the coil spring (12) in the state in which the locking has been established.

8 Claims, 7 Drawing Sheets

(56) References Cited

U.S. PATENT DOCUMENTS

| 2004/0135419 | A1* | 7/2004 | Kitamura | ............... | B60N 2/753 |
| | | | | | 297/411.3 |
| 2019/0084458 | A1 | 3/2019 | Nonaka | | |

FOREIGN PATENT DOCUMENTS

| JP | 2007-185223 | A | 7/2007 |
| JP | 5890525 | A | 3/2016 |
| JP | 2016-133138 | A | 7/2016 |
| JP | 2017-178197 | A | 10/2017 |
| WO | 2013-157471 | A1 | 10/2013 |

* cited by examiner

[FIG.1]
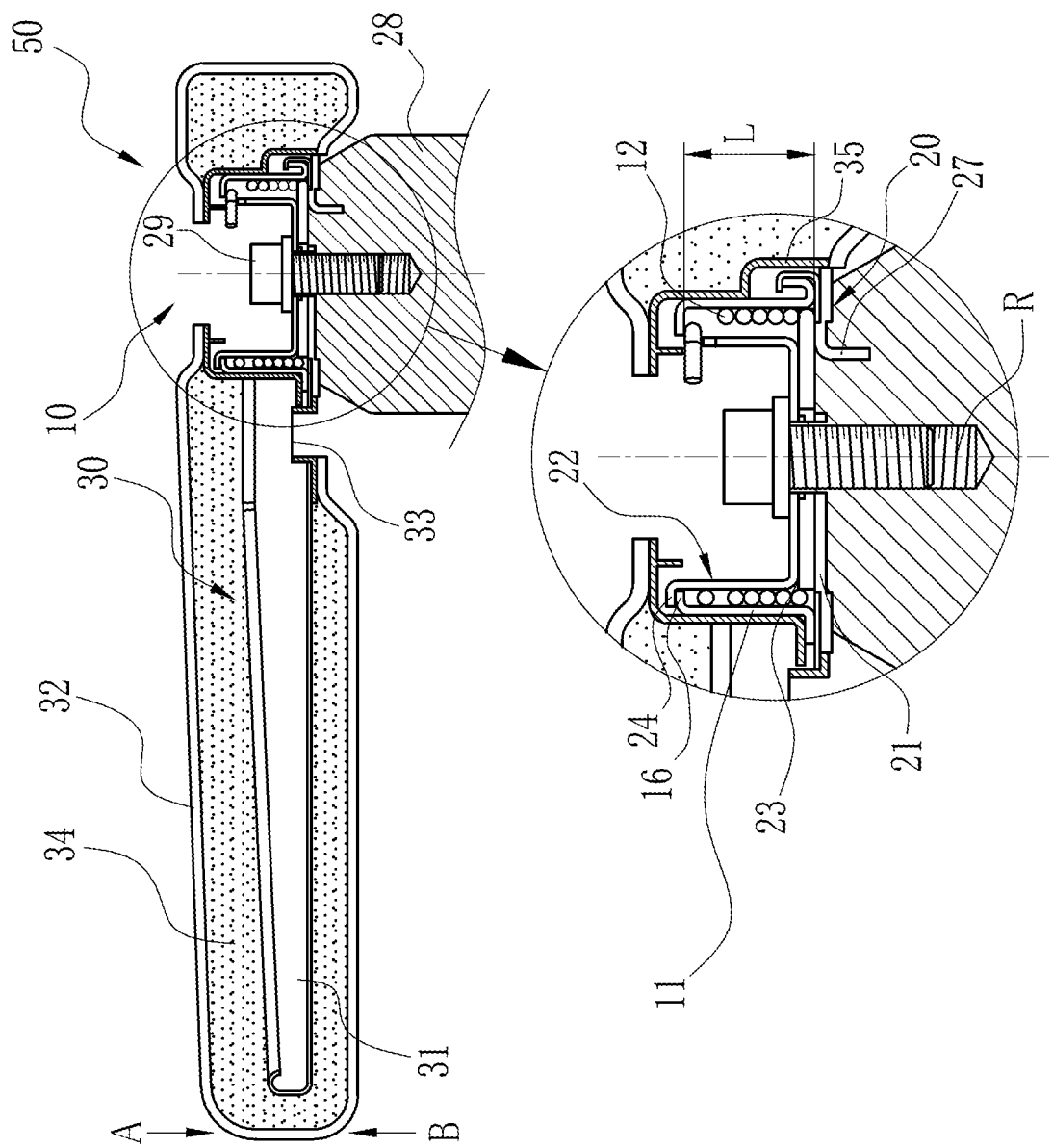

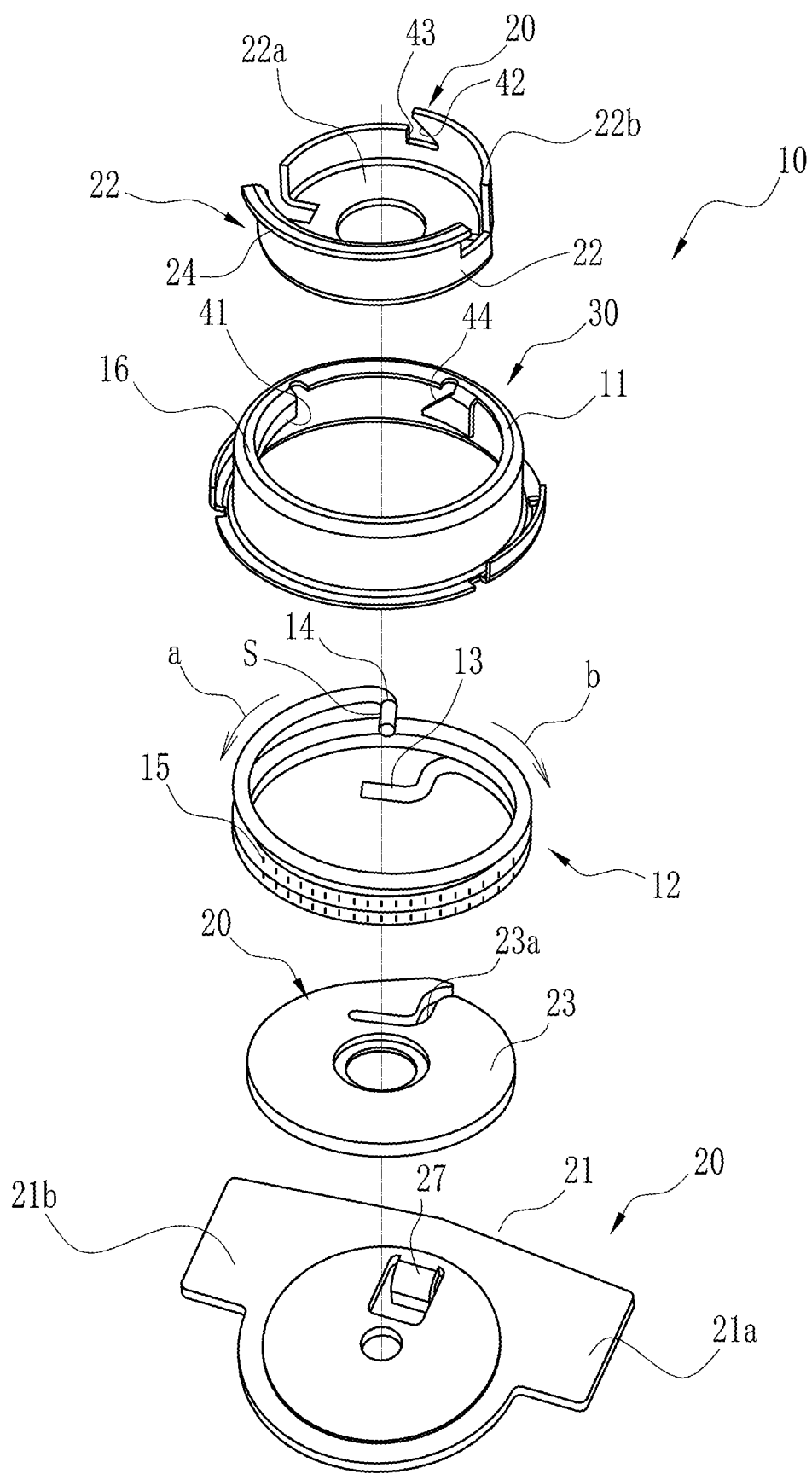
[FIG.2]

[FIG.3]
(a) 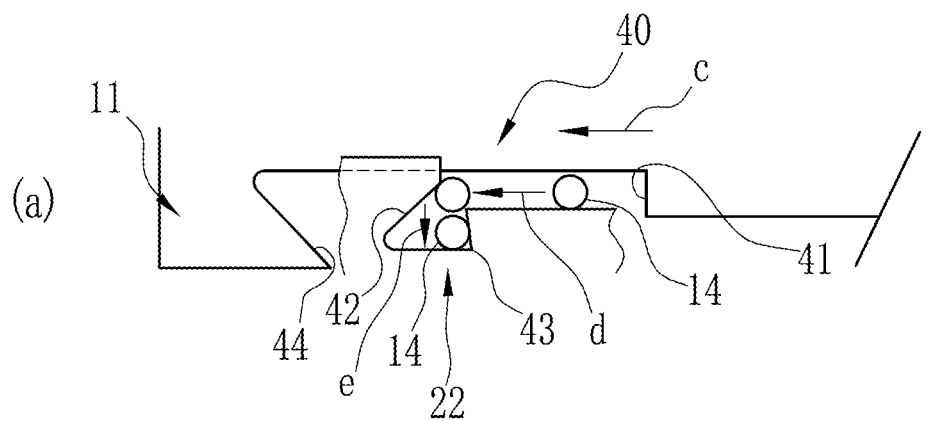
(b) 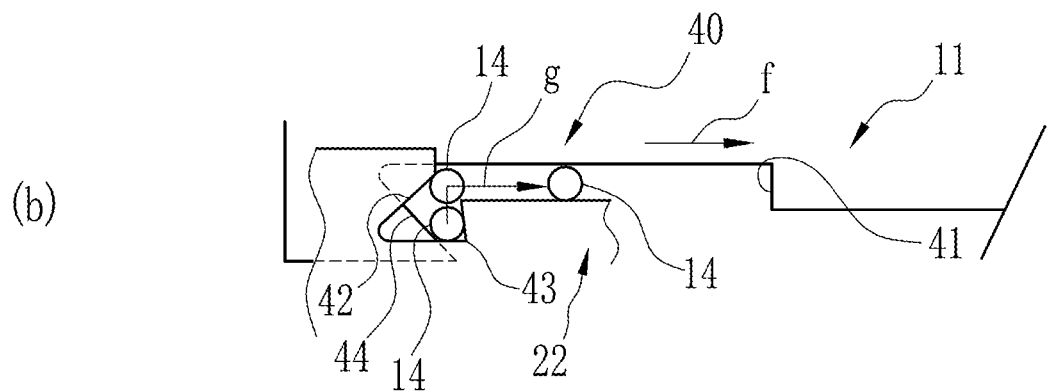
(c) 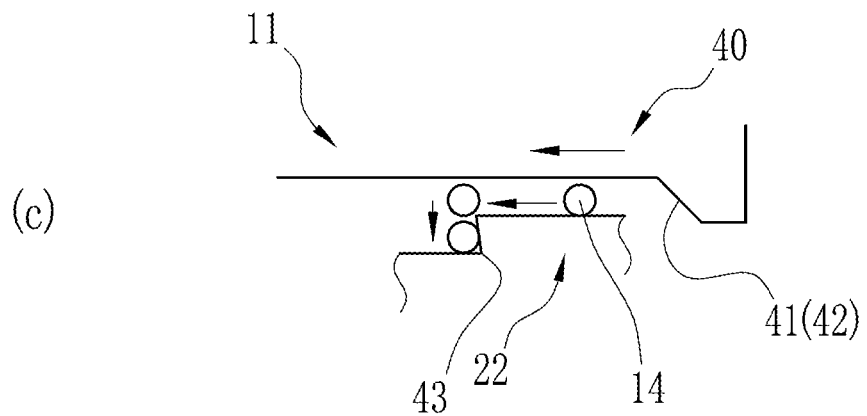

[FIG.4]
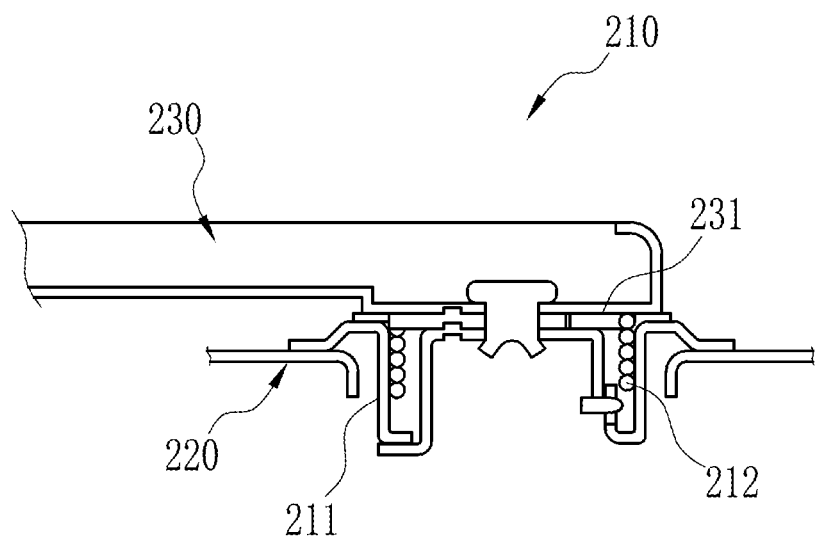

[FIG.5]
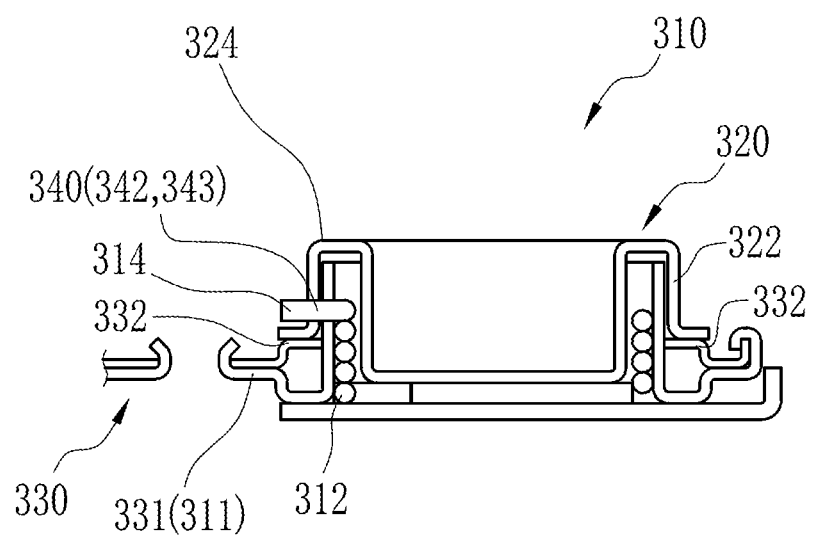

[FIG.6]
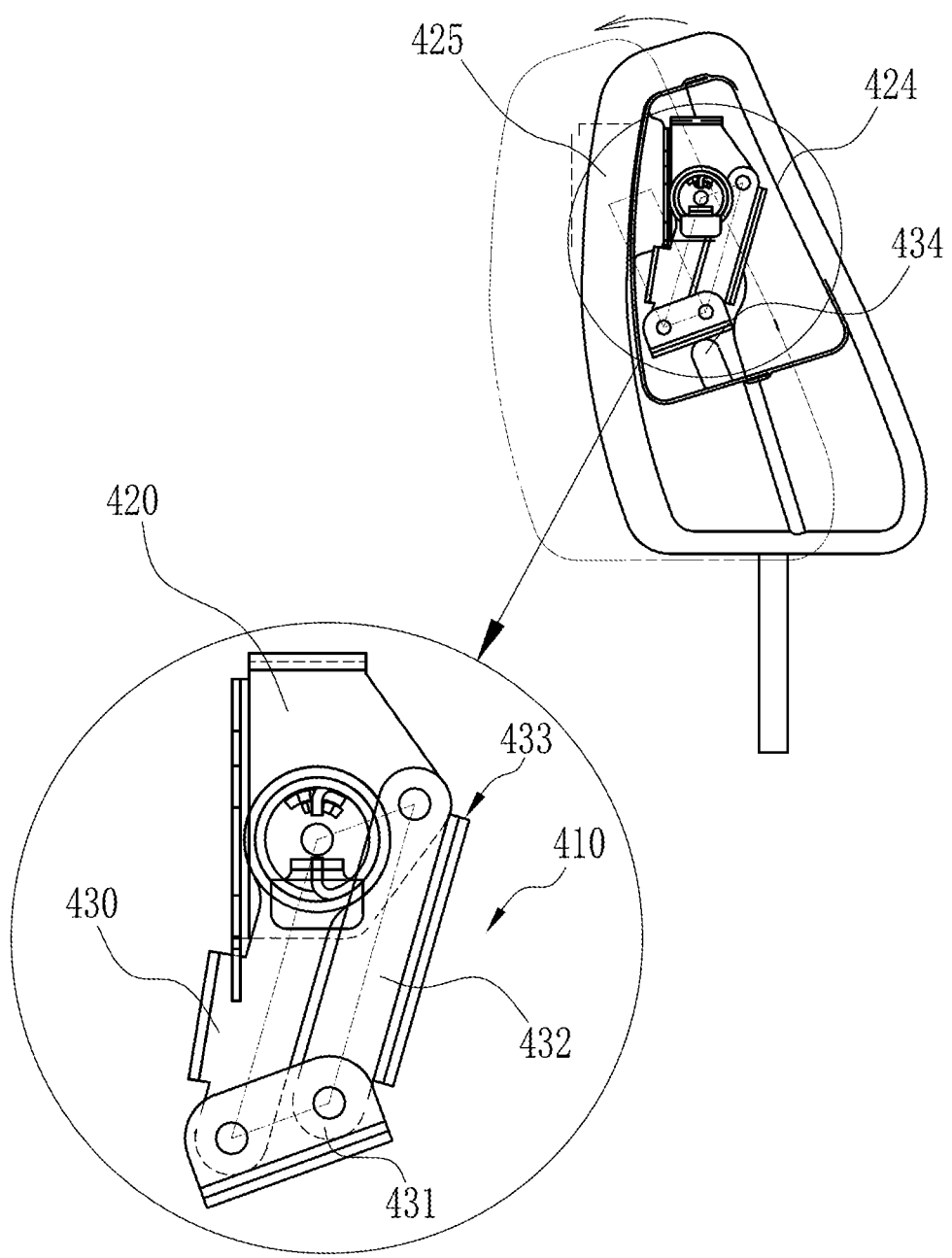

SPRING LOCK MECHANISM

TECHNICAL FIELD

The present disclosure relates to a spring lock mechanism.

BACKGROUND

In the related art, spring lock mechanisms are known as mechanisms that enable stepless adjustment of angles of armrests, ottomans, or headrests used for seats in vehicles or the like (see Patent Literature 1, for example). According to a spring lock mechanism in Patent Literature 1, a lock drum provided inside a coil spring that is configured of a spring wire material with a square section is fastened tight with the coil spring to cause a frictional force. Turning of an armrest in one direction is locked due to the frictional force. Also, according to the spring lock mechanism in Patent Literature 1, a secured end portion of the coil spring sticks out toward the outside, is bent, and is attached to a turning-side member at a position outside the lock drum. A free end portion is bent outward, and a switching mechanism to switch a state in which locking has been established and a state in which the locking has been released is provided outside the lock drum.

According to a spring lock mechanism in Patent Literature 2, a secured end portion of a coil spring is bent outside the coil spring and is secured to the outside of a lock drum. Also, a spring lock mechanism in Patent Literature 3 is to lock a lock drum using a coil spring provided at a position inside the lock drum and release the locking only when a lever is operated, and is based on a completely different designing concept from that of a switching mechanism provided with a function of holding a locking released state.

CITATION LIST

Patent Literature

Patent Literature 1: Japanese Patent Application Laid-open No. 2004-147791
Patent Literature 2: Japanese Patent No. 5890525
Patent Literature 3: Japanese Patent Application Laid-open No. 2016-133138

SUMMARY

In recent years, spring lock mechanisms have been required to have an increased holding force at the time of locking in order to improve safety of vehicles. Also, weight reduction and size reduction have always been required. However, the spring lock mechanism configured of the fixed-side member and the turning-side member in each of Patent Literature 1 and Patent Literature 2 locks turning by the coil spring fastening the lock drum tight from the outside. In this case, there is a concern that, if a burden is applied to the armrest, a load in a pulling direction may be applied to the spring wire material of the coil spring, and fracture may occur at a bent location of the secured end portion or the like. Thus, in the spring lock mechanism in each of Patent Literature 1 and Patent Literature 2, a burring portion (see a tubular portion 3a in Patent Literature 1, for example) holding the secured portion of the coil spring is provided, and a part of the coil spring is wound around the burring portion to cause the burring portion to share the burden and prevent concentration of the burden. This leads to an increase in the number of windings in order to cover a decrease in the effective number of windings of the coil spring. As a result, the height of the lock drum increases, or the diameter of the lock drum increases or the like, which is problematic.

Also, the spring lock mechanism in each of Patent Literature 1 and Patent Literature 2 has a problem of an increase in size since the coil spring is located outside the lock drum and the secured end portion of the coil spring is bent toward the outside relative to the lock drum and also significantly sticks out. Further, in a case in which the spring lock mechanism is integrally foamed and wrapped with a foamed member such as urethane, a foamed member entrance prevention cover provided to prevent entrance of the foamed member becomes complicated.

Also, the spring lock mechanism in Patent Literature 3 is to lock the lock drum using the coil spring provided at a position inside the lock drum, and a designing concept of a switching operation thereof is completely different. In this switching mechanism, the locking can be released only in a pressed state achieved by the lever, and the switching mechanism does not have a function of holding a locking released state with hands released therefrom.

An object of the present disclosure is to provide a spring lock mechanism capable of switching a state in which locking has been established and a state in which locking has been released and held through turning of a fixed-side member and a turning-side member while holding a necessary holding force at the time of the locking and capable of achieving high safety, weight reduction, and size reduction.

The aforementioned problem is solved by providing a spring lock mechanism including: a first member configured of a fixed-side member; a second member configured of a turning-side member that turns relative to the first member; a lock drum provided on either one of the first member and the second member; a coil spring secured to the other member and configured of a spring wire material that abuts on the lock drum and locks turning of the second member in one direction relative to the first member due to a frictional force; and a switching mechanism causing the second member to turn relative to the first member to switch a state in which the locking has been established and a state in which the locking has been released and held, in which the coil spring has a winding outer diameter in a free state that is greater than an inner diameter of the lock drum by 2 to 5% and abuts on an inner circumferential surface of the lock drum, a vicinity of one end portion of the coil spring is secured as a secured end portion bent inside the coil spring at a position inside the lock drum, a vicinity of the other end portion of the coil spring is a bent free end portion, the diameter of the coil spring increases through compression of the spring wire material of the coil spring in the longitudinal direction caused by the turning of the second member, and the coil spring thus further presses an inner circumferential surface of the lock drum and locks the turning due to the frictional force, and the switching mechanism accompanies an operation of extending or shortening a length of the coil spring in the state in which the locking has been released relative to the length of the coil spring in the state in which the locking has been established.

With this configuration, the coil spring abuts on the inner circumferential surface of the lock drum. In this manner, if a load caused by the frictional force applies in a direction in which the second member is locked (a turning direction in which the diameter of the coil spring increases), the spring wire material is compressed in the longitudinal direction. The load in the compression direction does not lead to any concern of fracture or splitting even if the spring wire material is compression-deformed, unlike a load in the pulling direction. A difference between strength against fracture due to the load in the compression direction and strength against fracture due to the load in the pulling direction significantly appears at a portion at which the spring wire material is bent, in particular.

It is thus not necessary to wind the coil spring around the burring portion and to fix the coil spring thereto to disperse the load as in the spring lock mechanisms in Patent Literature 1 and Patent Literature 2. Further, it is possible to achieve the securing of the coil spring within a saved space limited inside the lock drum by disposing the coil spring inside the lock drum. Also, since there is no concern that the coil spring causes fracture, it is possible to select a coil spring with a thin wire diameter and with a light weight. In addition, since the coil spring is disposed at a position inside the lock drum, a measure for preventing entrance of a foamed member is easily achieved in a case in which foamed urethane or the like is employed for making the armrest.

Also, according to this configuration, the distance from the center of the turning of the second member to the position at which the frictional force is caused becomes longer than those of the spring lock mechanisms in Patent Literature 1 and Patent Literature 2 by the length corresponding to the diameter of the spring wire material, and an advantageous holding force is achieved due to the principle of leverage. It is thus possible to reduce the diameter of the drum and the number of windings of the coil spring.

Also, according to this configuration, the switching between a lockable utilization state and a locking released state is performed through the turning of the second member, this accompanies displacement in a direction in which the length of the coil spring is extended or shortened, and holding of the locking released state can be safely and reliably achieved.

The coil spring may be provided with a rough surface at a position of an outer circumference at which the coil spring abuts on the lock drum by providing a plurality of uneven portions across the spring wire material of the coil spring. Note that since the uneven portions are provided at the outer circumference of the coil spring, shaping thereof can be easily performed with stable quality through rolling or the like. According to this configuration, the frictional force between the coil spring and the lock drum significantly increases, an improvement in holding force and stabile quality can be achieved, and it is also possible to reduce the number of windings of the coil spring and the diameter of the lock drum.

The switching mechanism is to switch the state in which the locking has been established and the state in which the locking has been released and held, includes at least a displacement cam extending or shortening the length of the coil spring relative to the length in the locked state, a holding portion holding a state in which the coil spring has been displaced, and a recovery cam returning the held coil spring to an original length in the locked state, and accompanies the operation of extending or shortening the length of the coil spring, and the switching between the state in which the locking has been established and the state in which the locking has been released and held is performed through the turning of the second member. It is thus possible to safely and reliably hold the locking released state.

The lock drum may be secured to the second member, and the first member may have a restricting portion restricting motion of the lock drum in an axial direction. According to this configuration, the restricting portion of the first member restricts motion of the second member in the axial direction (an inside-and-outside-seat direction, which will be described later, in the case of the armrest), and a locking mechanism that causes less deformation and rattling is realized.

As described above, according to the present disclosure, it is possible to realize a spring lock mechanism capable of switching a state in which locking has been established and a state in which locking has been released and held through turning of a fixed member and a movable member while holding a necessary holding force at the time of locking and capable of achieving high safety, weight reduction, and size reduction.

BRIEF DESCRIPTION OF THE DRAWINGS

FIG. 1 is a sectional view of an armrest according to a first embodiment of the present disclosure;

FIG. 2 is a perspective view of a state in which a spring lock mechanism is disassembled according to the first embodiment of the present disclosure;

FIG. 3 is an exploded view for explaining a relative positional relationship of a lock releasing cam, a recovery cam, a holding portion, a displacement cam, and a free end portion of a coil spring according to the first embodiment of the present disclosure;

FIG. 4 is a sectional view of a state in which a spring lock mechanism is disassembled according to a second embodiment of the present disclosure;

FIG. 5 is a sectional view of a spring lock mechanism according to a third embodiment of the present disclosure;

FIG. 6 is a side view illustrating a state in which a spring lock mechanism is attached to a headrest according to a fourth embodiment of the present disclosure.

DETAILED DESCRIPTION OF THE EMBODIMENTS

First Embodiment

Figure 7:
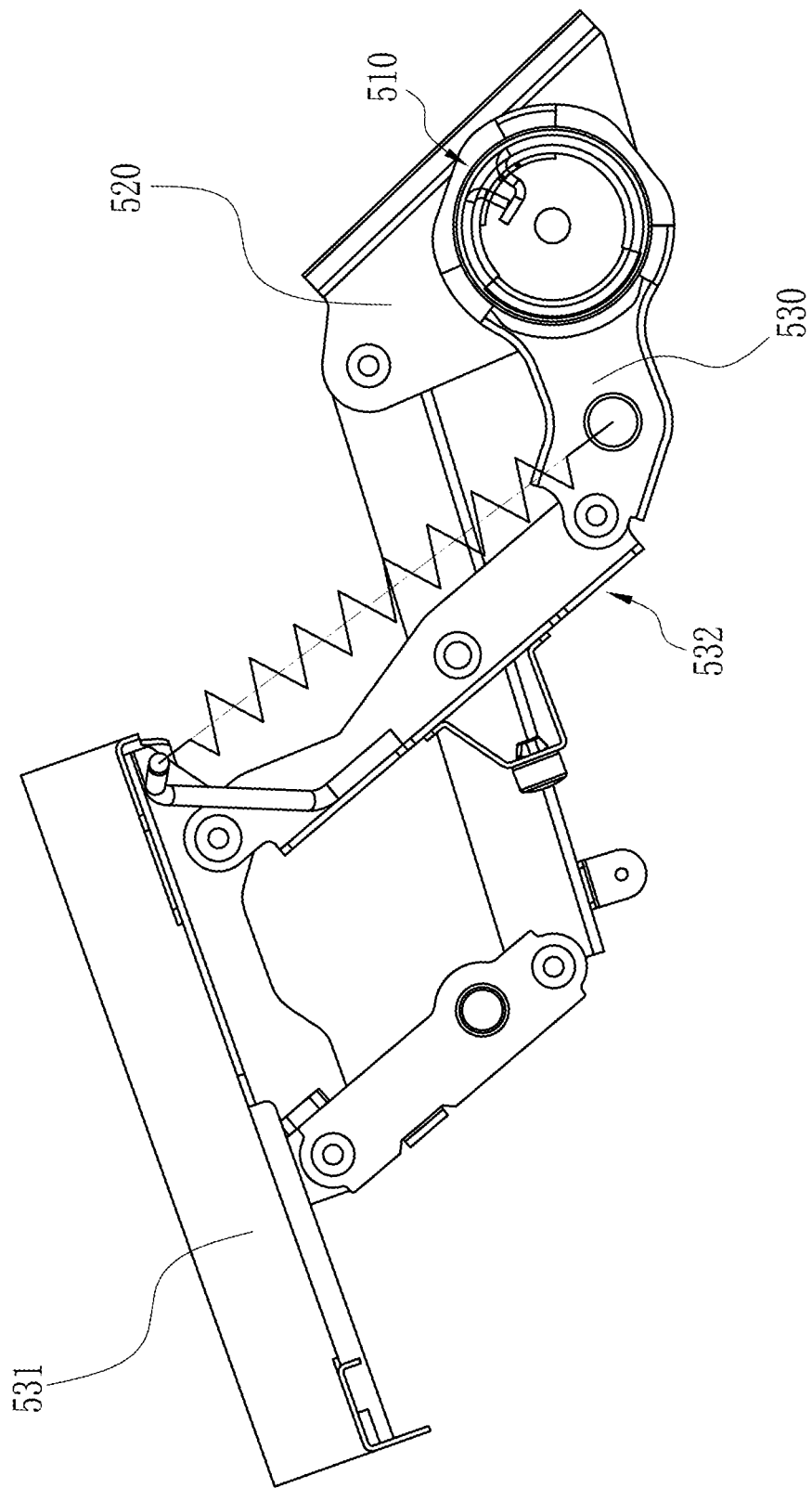
FIG. 7 is a sectional view illustrating a state in which a spring lock mechanism is attached to an ottoman device according to a fifth embodiment of the present disclosure.

Hereinafter, preferred embodiments of a spring lock mechanism according to the present disclosure will be specifically described using the drawings. FIG. 1 is a sectional view of an armrest 50 illustrating a state in which a spring lock mechanism 10 and an armrest frame 31 are covered with a skin 32 and the entire portions are integrated with a foamed resin (foamed member) 34 poured into the skin 32 according to a first embodiment of the present disclosure. FIG. 2 is a perspective view of a state in which the spring lock mechanism 10 is disassembled according to the first embodiment of the present disclosure. Note that the first to third embodiments will be described by exemplifying the armrest 50 that is to select an optimal position at which the armrest 50 is locked and used by adjusting an angle thereof within an angle adjustment range with a lower limit of 0 degrees and an upper limit of about 30 degrees to about 50 degrees and that is included in a vehicle seat.

In the first embodiment, the spring lock mechanism 10 includes a first member 20 configured of fixed-side members, a second member 30, a lock drum 11, a coil spring 12, and a switching mechanism 40 (see FIG. 3) as illustrated in FIG. 1. The second member 30 is configured of turning-side members that turn relative to the first member 20. The lock drum 11 is provided on either one of the first member 20 and the second member 30. In the first embodiment, the lock drum 11 is provided in the armrest frame 31 of the second member 30.

The coil spring 12 is provided at a position inside the lock drum 11. The coil spring 12 is secured to the other member (the first member 20 in the first embodiment) and is configured of a spring wire material that abuts on the lock drum 11 and locks turning of the second member 30 in one direction relative to the first member 20 due to a frictional force. The switching mechanism 40 (see FIG. 3) causes the armrest frame 31 that is the second member 30 to turn relative to the first member 20 to switch a state in which locking has been established and a state in which the locking has been released and held.

As illustrated in FIGS. 1 and 2, the first member 20 is configured of a plurality of fixed-side members including an attachment metal part 21, an inner drum 22, and a spring securing plate 23. As illustrated in FIG. 2, the spring securing plate 23 includes a spring securing portion 23a that secures a secured end portion 13 of the coil spring 12. As illustrated in FIG. 1, the spring securing plate 23 is provided between the attachment metal part 21 and the inner drum 22 and secures the coil spring 12 by sandwiching the secured end portion 13 (see FIG. 2) of the coil spring 12 with the attachment metal part 21 and the inner drum 22.

In FIG. 2, the inner drum 22 includes a flange (restricting portion) 24, a displacement cam 42 configuring the switching mechanism 40 (see FIG. 3), which will be described later, and a holding portion 43. The inner drum 22 has a cylindrical shape with a bottom portion 22a and an opening portion 22b, and the flange (restricting portion) 24 extends toward an outer circumferential direction of the opening portion 22b. The displacement cam 42 configuring the switching mechanism 40 and the holding portion 43 are provided at the opening portion 22b.

Note that although the first embodiment has been described by exemplifying the cylindrical inner drum 22, the inner drum 22 is not limited thereto. In other words, the inner drum 22 may not have a cylindrical shape as long as the inner drum 22 is a member configured of the flange (restricting portion) 24, the displacement cam 42, and the holding portion 43.

In FIG. 1, the attachment metal part 21, the inner drum 22, and the spring securing plate 23 are secured to a seat frame 28 with a bolt 29 in a non-rotatable manner.

In FIG. 1, the second member 30 is configured of turning-side members such as the armrest frame 31 and the lock drum 11. As illustrated in FIG. 1, the second member 30 configures the armrest 50 by covering the spring lock mechanism 10 and the armrest frame 31 with the skin 32 and pouring the foamed resin 34 (foamed polyurethane) into a gap between the armrest frame 31 and the skin 32 from an inlet port 33 to integrate the entire portions. A foamed member entrance prevention cover 35 to prevent entrance of the foamed resin 34 (foamed polyurethane) when the foamed resin 34 (foamed polyurethane) is poured is provided along the lock drum 11.

As illustrated in the enlarged view of FIG. 1 and FIG. 2, the lock drum 11 is provided at the second member 30 so as to turn integrally with the armrest frame 31. As illustrated in FIG. 2, the lock drum 11 has a cylindrical shape with openings at both ends, and the inner circumferential surface thereof is disposed to face the outer circumferential surface of the inner drum 22. A flange 16 is provided at an opening at one end of the lock drum 11 so as to extend toward the inside of the lock drum 11. The flange 16 is provided with a lock releasing cam 41 and a recovery cam 44 configuring the switching mechanism 40 corresponding to the displacement cam 42 and the holding portion 43 provided in the inner drum 22.

As illustrated in the enlarged view in FIG. 1, the lock drum 11 is disposed such that the flange 24 of the inner drum 22 overlaps the flange 16 of the lock drum 11 in a direction along an axis R (hereinafter, referred to as an "axial direction") and restricts motion of the lock drum 11 in a direction A toward the seat frame 28 and a direction B away from the seat frame 28 (hereinafter, referred to as an "inside-and-outside-seat direction").

Also, in a case in which a burden in the inside-and-outside-seat direction is applied to the armrest 50, the armrest 50 is slightly inclined in the inside-and-outside-seat direction with a securing portion between the seat frame 28 and the attachment metal part 21 located at the center, and the flange 24 and the flange 16 of the lock drum 11 abut on each other. Further, the second member 30 and the attachment metal part 21 also abut on each other. In other words, the flange 24 of the inner drum 22 and the attachment metal part 21 serve as restricting portions restricting motion of the lock drum 11 and the second member 30 in the inside-and-outside-seat direction (the same direction as the axial direction) and can thus restrict motion of the lock drum 11 and the second member 30 in the inside-and-outside-seat direction. Also, the strength in the inside-and-outside-seat direction increases by the flange 24 and the attachment metal part 21 receiving the burden.

As illustrated in FIG. 2, the coil spring 12 has the secured end portion 13, a free end portion 14, and uneven portions 15. The coil spring 12 has a winding outer diameter that is greater than the inner diameter of the lock drum 11 by about 2% to about 5% in the state illustrated in FIG. 2, and the coil spring 12 reduces the diameter thereof to be assembled with the lock drum 11 in the assembly state illustrated in FIG. 1. In this manner, the coil spring 12 in the state illustrated in FIG. 1 is brought into a state in which the coil spring 12 is in close contact with the inner circumferential surface of the lock drum 11 regardless of presence of the burden. The vicinity of one end portion of the coil spring 12 is bent inside the coil spring 12, is secured to the spring securing portion 23a included in the spring securing plate 23, and serves as the secured end portion 13.

In FIG. 2, the vicinity of the other end portion of the coil spring 12 is bent inside the coil spring 12 and serves as the free end portion 14 that receives actions from the lock releasing cam 41, the displacement cam 42, and the recovery cam 44. The coil spring is provided with a rough surface at a position of the outer circumference of the coil spring 12 (a position at which the coil spring 12 abuts on the inner circumferential surface of the lock drum 11) by providing the plurality of uneven portions 15 in a direction across the spring wire material of the coil spring 12 (the same direction as the axial direction). The uneven portions 15 are shaped at the position of the outer circumference of the coil spring 12 through rolling or the like, and the shaping thereof can be easily performed with stable quality at the position of the outer circumference.

Also, the coil spring 12 illustrated in FIGS. 1 and 2 is provided with a gap S that is about twice as wide as a wire material diameter between adjacent wire materials thereof so as to be able to be displaced in a direction in which the length of the coil spring 12 is shortened by the switching mechanism 40 (see FIG. 3). Note that the gap in the longitudinal direction of the coil spring 12 may be provided partially or over the entire length of the coil spring 12 in a distributed manner.

By securing the secured end portion 13 of the coil spring 12 with a large outer diameter to the spring securing plate 23 of the first member 20, reducing the diameter to incorporate the coil spring 12 in the lock drum 11, and bringing the outer circumferential surface of the coil spring 12 into close contact with the inner circumferential surface of the lock drum 11 in this manner, the coil spring 12 follows rotation of the lock drum 11 due to a frictional force generated between the coil spring 12 and the lock drum 11 when the lock drum 11 rotates integrally with rotation of the second member 30. Thus, the diameter of the coil spring 12 increases or decreases in accordance with a rotation direction of the second member 30.

The spring lock mechanism 10 in FIG. 2 is illustrated in a perspective view in which a spring lock mechanism for the armrest 50 (see FIG. 1) for a left hand that supports the left hand of a seated person is disassembled, and the winding direction of the coil spring 12 is left winding. If a force to turn the second member 30 (see FIG. 1), with which the lock drum 11 is integrated, in a lower direction is caused to act on the second member 30 in this configuration, a force that follows the turning of the lock drum 11 acts on the coil spring 12 due to the frictional force between the coil spring 12 and the lock drum 11. The direction of the force generated at this time is a direction in which the free end portion 14 is pushed in the left direction (see the arrow a). In this case, the spring wire material of the coil spring 12 is compressed in the longitudinal direction of the spring wire material (the longitudinal direction when the spring wire material is stretched), the diameter of the coil spring 12 increases, the inner circumferential surface of the lock drum 11 is further pressed against by the coil spring 12, and the turning of the armrest 50 in the lower direction is thus locked.

On the contrary, if a force to turn the second member 30 in the upper direction is caused to act on the second member 30, a force that follows the turning of the lock drum 11 acts on the coil spring 12 due to the frictional force between the coil spring 12 and the lock drum 11. The direction of the force generated at this time is a direction in which the free end portion 14 is pulled in the right direction (see the arrow b). In this case, the spring wire material of the coil spring 12 is pulled in the longitudinal direction of the spring wire material, the diameter of the coil spring 12 decreases, the force with which the coil spring 12 presses against the inner circumferential surface of the lock drum 11 is weakened, and the turning of the second member 30 in the upper direction is thereby allowed.

The spring lock mechanism 10 illustrated in FIG. 2 includes a switching mechanism and can perform switching between a state in which turning of the second member 30 in one direction relative to the first member 20 has been locked and a state in which the locking has been released and held in FIG. 1. Although details of the switching mechanism will be described later using FIG. 3, the state in which the locking has been released and held is a state in which a locking released state is maintained. As described above, although the turning of the armrest 50 in the lower direction is locked in the case in which a force in the lower direction acts on the second member 30, the locking released state is maintained in the state in which the locking has been released and held, and it is thus possible to turn the second member 30 in the lower direction.

The switching mechanism 40 illustrated in FIG. 3 has the lock releasing cam 41, the displacement cam 42, the holding portion 43, and the recovery cam 44 in FIG. 2. Note that the lock releasing cam 41 and the displacement cam 42 may be integrated (see FIG. 3(c)). In the first embodiment, the displacement cam 42 and the holding portion 43 are provided in the inner drum 22. Also, the lock releasing cam 41 and the recovery cam 44 are provided in the lock drum 11. Hereinafter, operations of the switching mechanism 40 will be described with reference to FIG. 3.

FIG. 3 is an exploded view for explaining a relative positional relationship of the lock releasing cam 41, the displacement cam 42, the holding portion 43, the recovery cam 44, and the free end portion 14 when an operation of turning the armrest 50 is performed. FIG. 3(a) is a diagram illustrating a state immediately before the second member 30 (see FIG. 1) of the armrest 50 reaches an upper limit position of an angle adjustment range (about 10 degrees before the upper limit position). The drawing illustrates a state in which the lock releasing cam 41 provided at the lock drum 11 has approached the free end portion 14 of the coil spring 12 and a state immediately before the lock releasing cam 41 starts to abut on the free end portion 14. The position of the lock releasing cam 41 is set at a position at which the lock releasing cam 41 starts to abut on the free end portion 14 when the second member 30 reaches the upper limit position of the angle adjustment range.

FIG. 3(b) is a diagram illustrating a state immediately before the second member 30 of the armrest 50 reaches the lower limit position through an operation of turning, in the lower direction, the second member 30 in a state in which locking has been released and held at the upper limit position. In the drawing, the recovery cam 44 provided at the lock drum 11 has started to abut on the free end portion 14 of the coil spring 12. The position of the recovery cam 44 is set at a position at which the recovery cam 44 starts to abut on the free end portion 14 when the second member 30 reaches the lower limit position of the angle adjustment range.

If the second member 30 is turned in the upper direction, the lock drum 11 is also turned integrally with the second member 30, and the lock releasing cam 41 provided at the lock drum 11 approaches the free end portion 14 of the coil spring 12 (see the arrow c) in FIG. 3(a). After the lock releasing cam 41 abuts on the free end portion 14, the free end portion 14 is pushed by the lock releasing cam 41 to advance (see the arrow d), the diameter of the coil spring 12 thus decreases, and the locked state achieved by the increase in diameter of the coil spring 12 is released.

Thereafter, the free end portion 14 is displaced in a direction in which the coil spring 12 is shortened in the axial direction (see the arrow e) by the displacement cam 42 provided at the inner drum 22, the coil spring 12 becomes shorter than the length L thereof in the locked state (see the enlarged view in FIG. 1), the free end portion 14 is guided to the holding portion 43, and the coil spring 12 is held in a state in which the length thereof has been shortened.

In this held state, the state in which the diameter of the coil spring 12 has decreased and the locked state has been released is also held, and it is thus possible to turn the second member 30 in the lower direction. If the second member 30 is turned in the lower direction from the upper limit position, the lock drum 11 also turns integrally with the second member 30 (see the arrow f) in FIG. 3(b). If the second member 30 is turned to a position immediately before the lower limit position, the recovery cam 44 provided at the lock drum 11 abuts on the free end portion 14 of the coil spring 12 as illustrated in FIG. 3(b).

If the turning of the second member 30 in the lower direction further advances from the state in FIG. 3(b), the free end portion 14 held by the holding portion 43 is pushed up by the recovery cam 44. The coil spring 12 extends in the axial direction by the free end portion 14 being pushed up. In this manner, the length of the coil spring 12 returns to the original length L in the locked state, the free end portion 14 returns to the original position, the diameter of the free end portion 14 increases (see the arrow g), and the coil spring 12 is recovered to the locked state in which the coil spring 12 is in close contact with the inner circumferential surface of the lock drum 11.

FIG. 3(c) is an exploded view of a case in which the lock releasing cam 41 and the displacement cam 42 are implemented by a single inclination cam 41 (42). Even if the single inclination cam 41 (42) is employed in this manner, operations thereof are similar to those of the switching mechanism 40 illustrated in FIGS. 3(a) and 3(b). Note that the holding portion 43 may be provided on the side on which the length L of the coil spring 12 is extended with the positional relationship between the lock drum 11 and the inner drum 22 turned upside down on the paper. In such a case, the free end portion 14 of the coil spring 12 is displaced on the side on which the length L of the coil spring 12 increases and is thus held by the holding portion 43.

Although the first embodiment has been described above, the spring lock mechanism 10 in FIG. 2 assumes the armrest 50 for the left hand supporting the left hand of the seated person and the winding direction of the coil spring 12 is left winding as described above, the winding direction of the coil spring 12 is right winding when the armrest 50 for a right hand supporting the right hand of the seated person is assumed.

Hereinafter, a spring lock mechanism of the present disclosure according to the second to fifth embodiments will be described. Note that only points that are different from those of the spring lock mechanism 10 in the first embodiment will be described below, and the same description of the other points will be omitted.

Second Embodiment

FIG. 4 is a sectional view of a spring lock mechanism 210 according to the second embodiment of the present disclosure. In the spring lock mechanism 210 in the second embodiment, a coil spring 212 is secured to a spring securing plate 231 of a second member 230 configured of turning-side members. A lock drum 211 is secured to a first member 220 configured of fixed-side members. In other words, the spring lock mechanism 210 in the second embodiment is different from the spring lock mechanism 10 in the first embodiment in that the coil spring 212 is secured to the second member 230 that is the turning-side member and the lock drum 211 is secured to the first member 220 configured of the fixed-side members. In this case, the lock drum 211 is incorporated in an empty space of the seat frame 220 on the side of the fixed-side members. This is advantageous since it allows the thickness of the turning-side members to be significantly reduced.

Third Embodiment

FIG. 5 is a sectional view of a spring lock mechanism 310 according to the third embodiment of the present disclosure. In the spring lock mechanism 310, a free end portion 314 is bent to the outside of the coil spring 312. Also, a part of an armrest frame 331 is shaped as a lock drum 311. A flange (restricting portion) 324 provided at an inner drum 322 of a first member 320 is provided to extend up to the outer circumferential surface of the lock drum 311 and abut on a flange receiving portion 332 as a separate member secured to the armrest frame 331 over the entire circumference of the flange receiving portion 332. By providing the flange 324 so as to abut on the flange receiving portion 332 over the entire circumference thereof in this manner, it is possible to more firmly restrict motion of the lock drum 311 and a second member 330 in the inside-and-outside-seat direction. In this manner, the strength in the inside-and-outside-seat direction further increases. A holding portion 343 and a displacement cam 342 configuring a switching mechanism 340 are provided at the flange 324. In other words, the spring lock mechanism 310 in the third embodiment is different from the spring lock mechanism 10 in the first embodiment in that the free end portion 314 is bent to the outside of the coil spring 312 and the holding portion 343 and the displacement cam 342 are provided outside a lock releasing cam and a recovery cam provided at the lock drum 311. Also, a part of the armrest frame 331 is shaped as the lock drum 311, and size reduction and weight reduction of the spring lock mechanism 310 can thus be achieved.

Fourth Embodiment

FIG. 6 is a side view illustrating a state in which a spring lock mechanism 410 is attached to a headrest according to the fourth embodiment of the present disclosure. As illustrated in FIG. 6, a first member 420 that is a fixed-side member in the spring lock mechanism 410 is secured to a headrest body 425 via a headrest cover 424 in this headrest. Also, a second member 430 that is a turning-side member is secured to a parallel linking mechanism 433 configured of the second member 430, a third member 431, and a fourth member 432. The third member 431 of the parallel linking mechanism 433 is secured to a headrest stay 434. This enables a configuration in which sliding of the headrest body 425 in the front direction (the left direction on the paper; see the arrow in FIG. 6) is allowed while sliding thereof in the back direction (the right direction on the paper) is locked. On the other hand, if the sliding adjustment range is exceeded, then it is possible to release the locking, to slide the headrest body 425 in the back direction, and to return the headrest body 425 to an initial position.

Fifth Embodiment

FIG. 7 is a side view of an example illustrating a state in which a spring lock mechanism 510 is attached to an ottoman according to the fifth embodiment of the present disclosure. As illustrated in FIG. 7, a first member 520 that is a fixed-side member in the spring lock mechanism 510 is secured to the seat frame (not illustrated) in the ottoman device. Also, a second member 530 that is a turning-side member is secured to a linking member 532 that turns a footrest body 531 in the up-down direction. In this manner, turning of the footrest body 531 in the lower direction within an angle adjustable range is locked. On the other hand, it is possible to switch a state in which locking has been established and a state in which the locking has been released and also to hold the state in which the locking has been released by turning the footrest body 531 and turning the second member 530 relative to the first member 520.

As described above, the present disclosure can realize a spring lock mechanism capable of switching a state in which locking has been established and a state in which the locking has been released and held through turning of a fixed-member and a turning member while holding a necessary holding force at the time of locking and capable of achieving high safety, weight reduction, and size reduction, as a result of pursuing the locking structure and the spring securing structure of the spring lock mechanism.

DESCRIPTION OF REFERENCE SIGNS 10, 210, 310, 410, 510 Spring lock mechanism
11, 211, 311 Lock drum
12, 212, 312 Coil spring
13 Secured end portion
14, 314 Free end portion
15 Uneven portion
16 Flange
20, 320, 420, 520 First member
21 Attachment metal part
22, 322 Inner drum
22a Bottom portion
22b Opening portion
23 Spring securing plate
23a Spring securing portion
24, 324 Flange
28 Seat frame
29 Bolt
30, 230, 330, 430, 530 Second member
31, 331 Armrest frame
32 Skin
33 Inlet port
34 Foamed resin
35 Foamed member entrance prevention cover
40, 340 Switching mechanism
41 Lock releasing cam
42, 342 Displacement cam
43, 343 Holding portion
44 Recovery cam
41 (42) Inclination cam
50 Armrest
220 First member (seat frame)
231 Spring securing plate
332 Flange receiving portion as separate member
424 Headrest cover
425 Headrest body
431 Third member
432 Fourth member
433 Parallel linking mechanism
434 Headrest stay
531 Footrest body
532 Linking member
S Gap
A Direction toward seat frame
B Direction away from seat frame
L Length of coil spring in locked state
R Axis
S Gap

What is claimed is:

1. A spring lock mechanism comprising:
a first member configured of a fixed-side member;
a second member configured of a turning-side member that turns relative to the first member;
a lock drum provided on either one of the first member and the second member;
a coil spring secured to the other member and configured of a spring wire material that abuts on the lock drum and locks turning of the second member in one direction relative to the first member due to a frictional force; and
a switching mechanism causing the second member to turn relative to the first member to switch a state in which the locking has been established and a state in which the locking has been released and held, wherein
the coil spring has a winding outer diameter in a free state that is greater than an inner diameter of the lock drum by 2 to 5% and abuts on an inner circumferential surface of the lock drum,
a vicinity of one end portion of the coil spring is secured as a secured end portion bent inside the coil spring at a position inside the lock drum,
a vicinity of the other end portion of the coil spring is a bent free end portion,
the diameter of the coil spring increases through compression of the spring wire material of the coil spring in the longitudinal direction caused by the turning of the second member, and the coil spring thus further presses an inner circumferential surface of the lock drum and locks the turning due to the frictional force, and
the switching mechanism accompanies an operation of extending or shortening a length of the coil spring in the state in which the locking has been released relative to the length of the coil spring in the state in which the locking has been established.

2. The spring lock mechanism according to claim 1, wherein
the coil spring is provided with a rough surface at a position of an outer circumference at which the coil spring abuts on the lock drum by providing a plurality of uneven portions across the spring wire material of the coil spring.

3. The spring lock mechanism according to claim 2, wherein
the switching mechanism is to switch the state in which the locking has been established and the state in which the locking has been released and held, includes at least a displacement cam extending or shortening the length of the coil spring relative to the length in the locked state, a holding portion holding a state in which the coil spring has been displaced, and a recovery cam returning the held coil spring to an original length in the locked state, and accompanies the operation of extending or shortening the length of the coil spring, and the switching between the state in which the locking has been established and the state in which the locking has been released and held is performed through the turning of the second member.

4. The spring lock mechanism according to claim 3, wherein
the lock drum is secured to the second member, and the first member has a restricting portion restricting motion of the lock drum in an axial direction.

5. The spring lock mechanism according to claim 2, wherein
the lock drum is secured to the second member, and the first member has a restricting portion restricting motion of the lock drum in an axial direction.

6. The spring lock mechanism according to claim 1, wherein
the switching mechanism is to switch the state in which the locking has been established and the state in which the locking has been released and held, includes at least a displacement cam extending or shortening the length of the coil spring relative to the length in the locked state, a holding portion holding a state in which the coil spring has been displaced, and a recovery cam returning the held coil spring to an original length in the locked state, and accompanies the operation of extending or shortening the length of the coil spring, and the switching between the state in which the locking has been established and the state in which the locking has been released and held is performed through the turning of the second member.

7. The spring lock mechanism according to claim 6, wherein
the lock drum is secured to the second member, and the first member has a restricting portion restricting motion of the lock drum in an axial direction.

8. The spring lock mechanism according to claim 1, to wherein
the lock drum is secured to the second member, and the first member has a restricting portion restricting motion of the lock drum in an axial direction.

\* \* \* \* \*